April 16, 1957     A. F. FALLON     2,788,978
SPLINED ARBORS

Filed Jan. 24, 1955     3 Sheets-Sheet 1

*INVENTOR.*
ALBIN F. FALLON
BY
*Hauke & Hardesty*
ATTORNEYS

April 16, 1957     A. F. FALLON     2,788,978
SPLINED ARBORS

Filed Jan. 24, 1955     3 Sheets-Sheet 2

INVENTOR.
ALBIN F. FALLON
BY
*Hauke & Hardesty*
ATTORNEYS

April 16, 1957  A. F. FALLON  2,788,978
SPLINED ARBORS
Filed Jan. 24, 1955  3 Sheets-Sheet 3
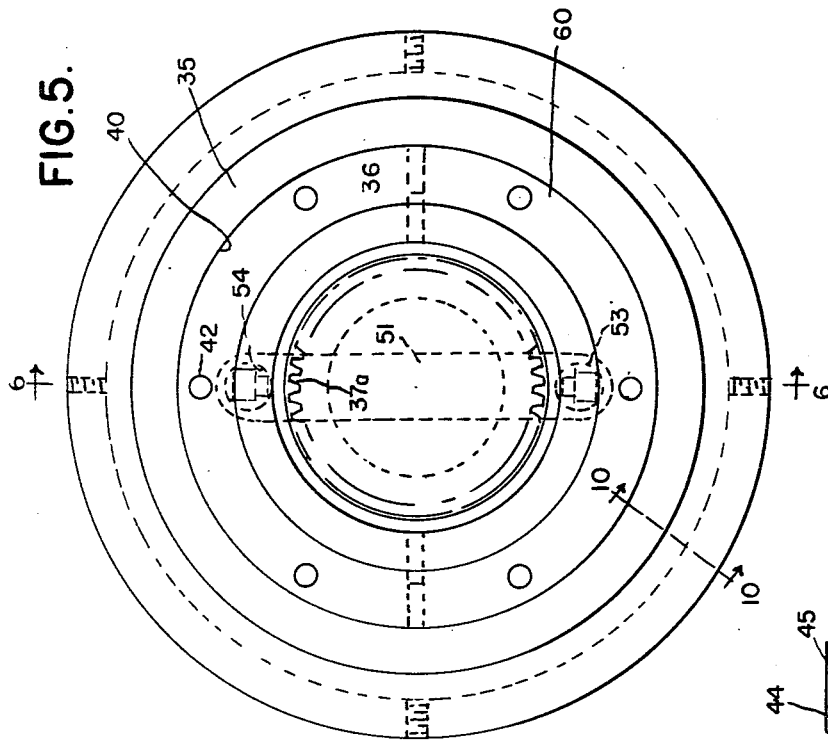
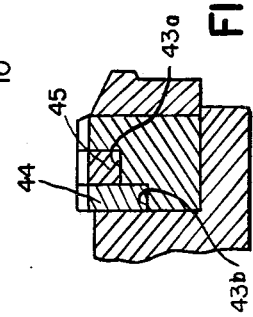
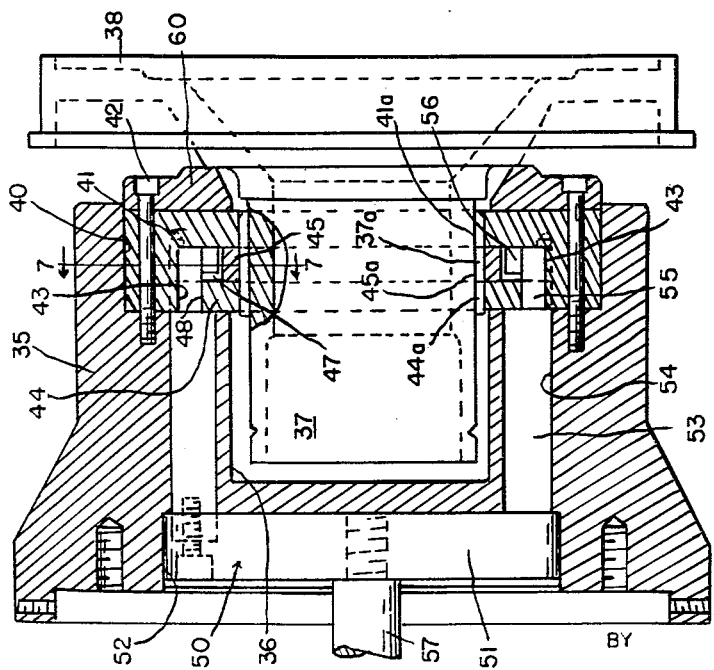
INVENTOR.
ALBIN F. FALLON
BY Hauke & Hardesty
ATTORNEYS United States Patent Office 2,788,978
Patented Apr. 16, 1957

2,788,978

SPLINED ARBORS

Alvin F. Fallon, Grosse Pointe, Mich.

Application January 24, 1955, Serial No. 483,730

9 Claims. (Cl. 279—1)

My invention relates to arbors and more particularly to that type of arbor known throughout the trade as spline arbors.

In the manufacture of gears or the mounting of gears and pinions on shafts and the like, it is sometimes noted that these are provided with externally splined stub shafts and the same are mounted in internally splined chucks or arbors to position and center them so that they may be machined. In precision machining of said work pieces, it is found difficult to accurately center these pieces on the conventional chuck or arbor.

It is an object of my invention to overcome the aforesaid difficulties attendant in the application and use of internally splined arbors in the precision machining of such work pieces by providing an adjustable internally splined arbor adapted to be readily and securely locked in adjustment, whereby to positively hold the workpiece securely centered with respect to the arbor.

Further objects of my invention are to provide an improved adjustable arbor of the aforesaid type for supporting a workpiece having a relatively small splined shank, by constructing same with an improved and simplified adjusting mechanism, more particularly constructed to angularly adjust an internally splined intermediate annular member or ring relative to the internally splined elements fixed to the support whereby to more securely hold the workpiece centered with respect to said support.

For a more detailed understanding of my invention, reference may be had to the accompanying drawings illustrating preferred embodiments of my invention in which like characters refer to like parts throughout the several views, and in which Fig. 1 is an end elevational view of my improved adjustable arbor.

Fig. 2 is a vertical longitudinal sectional view thereof taken substantially on the line 2—2 of Fig. 1.

Figs. 3 and 4 are fragmentary detail sectional views taken respectively on the lines 3—3 and 4—4 of Fig. 2.

Fig. 5 is an end elevational view of a modified construction.

Fig. 6 is a vertical longitudinal sectional view taken substantially on the line 6—6 of Fig. 5.

Fig. 10 is a detail sectional view taken on the line 10—10 of Fig. 5.

Figure 1:
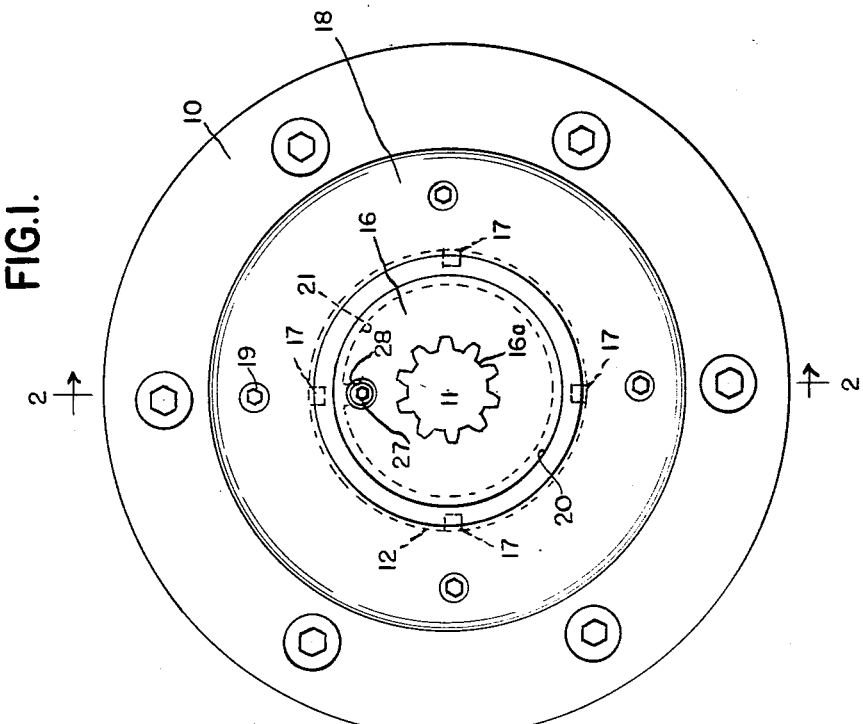
Figure 2:
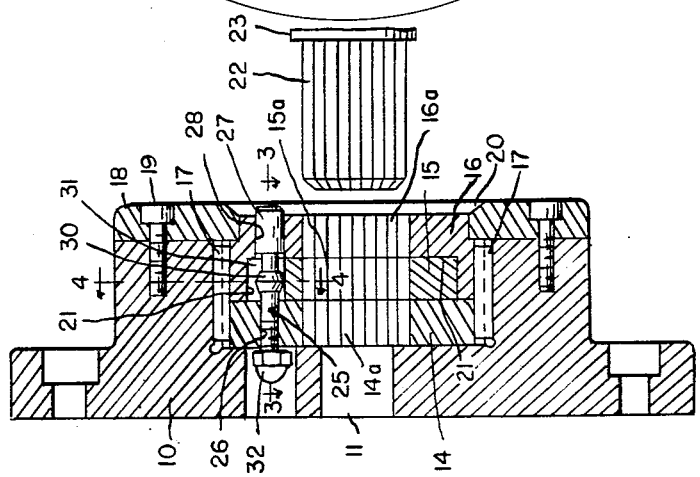

The arbor illustrated in Figs. 1 to 4 inclusive embodies a support 10, axially bored as at 11 and provided with a counterbored portion 12 forming an enlarged cylindrical recess for receiving the workpiece supports, which comprise a plurality of internally splined annular members or rings 14, 15 and 16 respectively.

The annular rings 14 and 16 are keyed to the support by keys 17 and are also provided with splined bores 14a and 16a. A cover or end plate 18 is fastened to the support 10 by means of screws 19 or other suitable means and provided with a central bore 20 which serves to pilot member 16 and center same to the support. The end plate also serves to retain members 14, 15 and 16 in the recess 12.

The intermediate annular member or ring 15 is rotatably supported and is preferably and conveniently rotatably supported in the cylindrical recess 21 of member 16 and in axial alignment with respect to members 14 and 16. The annular member 15 is also provided with a splined bore 15a, and these splines 14a, 15a and 16a are arranged substantially in alignment for engagement and fit with a splined shaft 22 of a workpiece 23 (shown in Fig. 2).

Figure 3:
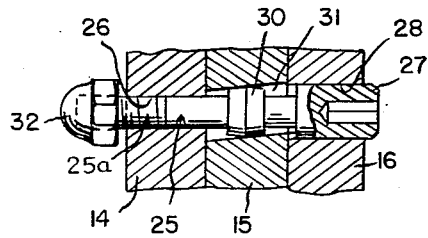
Figure 4:
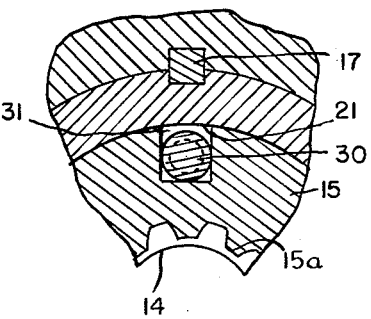
Figure 7:
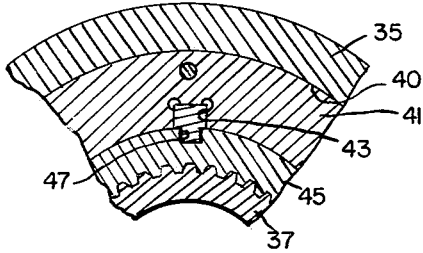
Fig. 7 is a fragmentary detail sectional view taken on the line 7—7 of Fig. 6.
Figure 8:
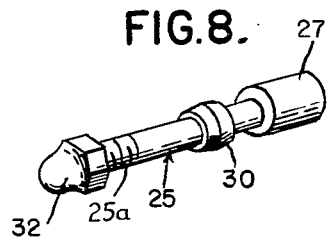
Fig. 8 is a perspective view of the actuator embodied in the arbor illustrated in Figs. 1 to 4 inclusive.
Figure 9:
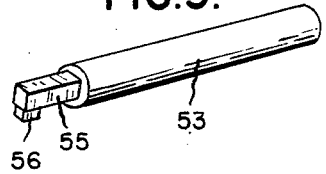
Fig. 9 is a perspective view of the actuator embodied in the arbor illustrated in Figs. 5 and 6.

The intermediate rotatably supported annular member 15 is adapted to be angularly adjusted to secure and hold the workpiece centered with respect to the support. This is accomplished by means of an actuator 25 comprising a shank end 25a screwed into a tapped hole 26 in the non-rotatable member 14, the other end 27 being guided in a bore 28 in member 16. The medial portion of the actuator carries an enlarged portion 30 tapered as shown to fit the helical groove 31 in the rotatable member 15. Thus by screwing the actuator "in" or "out," the projection or lug 30 is moved longitudinally of the helical groove 31 and thus angularly shifts or adjusts this intermediate member, causing its splined bore 15a to coact with the splined bores 14a and 16a and accurately secure and center the splined hub or stub shaft 22 of the workpiece 23 with respect to the support, which is adapted to be driven by suitable connections with a source of power (not shown). Figs. 4 and 8 illustrate this actuator and Fig. 3 illustrates the helical groove and shows how said part 30 fits this groove. A cap nut 32 is secured to the actuator shank end 26 to limit the travel of said actuator.

The modified construction shown in Figs. 5 and 6 is one more embodiment particularly adapted to hold and center a workpiece having a large diameter blank that rather closely overlies the end face of the arbor, and this construction embodies a modified actuator construction, but is quite similar in its operation as the structure illustrated in Figs. 1 to 4 inclusive.

This modified structure comprises a support 35 having a central recess 36 receiving the stub shaft 37 of a workpiece 38, the shaft 37 having a splined portion 37a engaging the internal splines of the arbor elements. The recess 36 is counterbored to provide an enlarged cylindrical recess or bore 40 and the annular member or ring 41 is fitted into the bore 40 and secured to the support 35 by screws or bolts 42. This member is provided with an inwardly facing cylindrical recess 43 in which are supported the other annular members 44 and 45. The recess 43 provides a bore 43a for rotatably supporting member 45 and a bore 43b for supporting member 44. The member 45 is provided with a pair of diametrically opposed helical grooves 47 and the member 44 is provided with slots 48.

An actuator assembly 50 is longitudinally movably supported by the support 35 and comprises a bar 51 fitted into a recess 52 in the back of the support 35 and this bar carries a pair of bars 53 and guided in the holes 54 in the support. The outer end of each bar 53 carries a squared extension 55 guided in slots 48 of member 44, thus non-rotatably securing member 44 to the support and a radially inwardly projecting lug or ear 56 inclined to fit the helical groove 47. A draw bar 57 is attached to the cross bar 51 and is adapted to be manually actuated, or if preferred, can be actuated by air or hydraulic means. The groove 47 is similar in design to the helical groove 31 of Figs. 2 and 4, and the projection 56 is preferably inclined to fit the helical groove 47. The members 41, 44 and 45 are each respectively splined as shown at 41a, 44a and 45a.

An end plate 60 is secured to the end member by screws 42 and serves as a pilot or stop for the workpiece 38.

It will be apparent to those skilled in the art to which my invention pertains that various changes and modifications may be made herein without departing from the spirit of my invention or from the scope of the appended claims.

I claim:

1. An internally splined arbor comprising a support, a pair of axially spaced annular members non-rotatably fixed to said support and having aligned substantially identical internally splined bores, a rotatable member coaxial with respect to said two non-rotatable members and having an internally splined bore substantially identical with the internal splines of said other members, a longitudinally adjustable actuator, an external helical groove in said rotatable member, said actuator engaged in said helical groove and moved longitudinally to angularly adjust rotatable member with respect to said non-rotatable members, said internal splines of said members being adapted to engage external splines on a workpiece to hold said workpiece centered on said support.

2. An internally splined arbor comprising a support, a pair of axially spaced annular members non-rotatably fixed to said support and having aligned substantially identical internally splined bores, a rotatable member coaxial with respect to said two non-rotatable members and having an internally splined bore substantially identical with the internal splines of said other members, a longitudinally adjustable actuator, an external helical groove in said rotatable member, said actuator engaged in said helical groove and moved longitudinally to angularly adjust said rotatable member with respect to said non-rotatable members, said internal splines of said members being adapted to engage external splines on a workpiece to hold said workpiece centered on said support, said rotatable member located intermediate said non-rotatable members.

3. An internally splined arbor comprising a support, a pair of axially spaced annular members non-rotatably fixed to said support and having aligned substantially identical internally splined bores, a rotatable member coaxial with respect to said two non-rotatable members and having an internally splined bore substantially identical with the internal splines of said other members, a longitudinally adjustable actuator, an external helical groove in said rotatable member, said actuator engaged in said helical groove and moved longitudinally to angularly adjust said rotatable member with respect to said non-rotatable members, said internal splines of said members being adapted to engage external splines on a workpiece to hold said workpiece centered on said support, said support having a cylindrical recess, said members disposed in said recess, and an end plate secured to said support and clamping said member in said recess.

4. An internally splined arbor comprising a support, a pair of axially spaced annular members non-rotatably fixed to said support and having aligned substantially identical internally splined bores, a rotatable member coaxial with respect to said two non-rotatable members and having an internally splined bore substantially identical with the internal splines of said other members, a longitudinally adjustable actuator, an external helical groove in said rotatable member, said actuator engaged in said helical groove and moved longitudinally to angularly adjust said rotatable member with respect to said non-rotatable members, said internal splines of said members being adapted to engage external splines on a workpiece to hold said workpiece centered on said support, one of said non-rotatable members having an enlarged axial bore providing a bearing for said rotatable member and serving to axially align said members.

5. An internally splined arbor comprising a support, a pair of axially spaced annular members non-rotatably fixed to said support and having aligned substantially identical internally splined bores, a rotatable member coaxial with respect to said two non-rotatable members and having an internally splined bore substantially identical with the internal splines of said other members, a longitudinally adjustable actuator, an external helical groove in said rotatable member, said actuator engaged in said helical groove and moved longitudinally to angularly adjust said rotatable member with respect to said non-rotatable members, said internal splines of said members being adapted to engage external splines on a workpiece to hold said workpiece centered on said support, one of said non-rotatable members having an enlarged axial bore providing a bearing for said rotatable member and serving to axially align said members, said support having a cylindrical recess for housing said members, and one or more key and keyway assemblies for locking said non-rotatable members in said support recess.

6. In an internally splined arbor comprising a support, a pair of axially spaced annular members non-rotatably fixed to said support and having aligned substantially identical internally splined bores, a rotatable member coaxial with respect to said two non-rotatable members and having an internally splined bore substantially identical with the internal splines of said other members, a longitudinally adjustable actuator, an external helical groove in said rotatable member, said actuator engaged in said helical groove and moved longitudinally to angularly adjust said rotatable member with respect to said non-rotatable members, said internal splines of said members being adapted to engage external splines on a workpiece to hold said workpiece centered on said support, one of said non-rotatable members having an enlarged axial bore providing a bearing for said rotatable member and serving to axially align said members, said actuator screw threaded in one of said non-rotatable member and guided longitudinally in said other non-rotatable member and having a reduced diameter mid-section and a medial enlargement engaged in said helical groove of said intermediate rotatable member.

7. In an internally splined arbor comprising a support structure having an axial bore receiving a workpiece and counterbored at one end, axially spaced annular members disposed within the counterbore of said support, means non-rotatably securing some of said members to support another of said members rotatably supported by said one of said non-rotatable members, all said members having an internally splined axial bore, said rotatably supported member having a helical groove, and one or more longitudinally movable actuators having a radially inwardly extending projection engaging said helical groove and operable to angularly adjust said rotatable member with respect to said non-rotatable member, said internal splines of said members being adapted to engage external splines on a workpiece to hold said workpiece centered with respect to said support.

8. In an internally splined arbor comprising a support provided with an axially disposed cylindrical recess at one end, a pair of annular internally splined members assembled in said support recess and non-rotatably secured to said support and having aligned internally splined bores, a third splined member rotatably supported intermediate said first mentioned members and having a radially outwardly facing helical groove, and a longitudinally movable actuator guided by one of said first mentioned members and engaged in said helical groove of said third member, and means for moving said actuator longitudinally axially of said support to angularly adjust said third supported member with respect to said other members, said internal splines of said members being adapted to engage external splines on a workpiece to hold said workpiece centered with respect to said support.

9. In an internally splined arbor comprising a support provided with an axially disposed cylindrical recess at one end, a pair of annular internally splined members assembled in said support recess and non-rotatably secured to said support and having aligned internally splined bores, a third splined member rotatably supported intermediate said first mentioned members and having a radially outwardly facing helical groove, and a longitudinally movable actuator guided by one of said first mentioned members and engaged in said helical groove of said third member, and means for moving said actuator longitudinally axially of said support to angularly adjust said third supported member with respect to said other members, said internal splines of said members being adapted to engage external splines on a workpiece to hold said workpiece centered with respect to said support, said actuator longitudinally movably supported by said support.

References Cited in the file of this patent

UNITED STATES PATENTS

| | | |
|---|---|---|
| 2,555,496 | Mackmann | June 5, 1951 |
| 2,665,136 | Fallon | Jan. 5, 1954 |